United States Patent

[11] 3,619,136

| [72] | Inventor | Everett N. Case |
| | | Flossmoor, Ill. |
| [21] | Appl. No. | 774,960 |
| [22] | Filed | Nov. 12, 1968 |
| [45] | Patented | Nov. 9, 1971 |
| [73] | Assignee | Atlantic Richfield Company |

[54] PROCESS FOR PRODUCING PHOSPHORIC ACID
22 Claims, 3 Drawing Figs.

[52] U.S. Cl. ................................................. 23/165, 23/122
[51] Int. Cl. ........................................... C01b 25/18, C01b 25/22
[50] Field of Search ............................................ 23/165, 122

[56] References Cited
UNITED STATES PATENTS

| 2,002,547 | 5/1935 | Norden .................. | 23/165 |
| 2,531,977 | 11/1950 | Hammaren et al. .......... | 23/122 |
| 2,710,247 | 6/1955 | Knowles et al. ............. | 23/165 |
| 2,890,936 | 6/1959 | Benefield ................... | 23/165 |
| 2,954,287 | 8/1960 | Carothers et al. .......... | 71/40 |
| 3,124,419 | 3/1964 | Germain et al. ............. | 23/165 |
| 3,442,610 | 5/1969 | Mustzan et al. ............. | 23/165 |
| 3,453,076 | 7/1969 | Long et al. .................. | 23/165 |

Primary Examiner—Oscar R. Vertiz
Assistant Examiner—Gregory A. Heller
Attorneys—Morton, Bernard, Brown, Roberts & Sutherland, John W. Behringer, Eugene L. Bernard, Martin J. Brown, James N. Dresser, W. Brown Morton, Jr., John T. Roberts and Malcolm S. Sutherland ABSTRACT: A process for the production of phosphoric acid from phosphate rock comprising reacting the phosphate rock with an equilibrated phosphoric acid having a $P_2O_5$ concentration between about 20 to 50 percent in an attack stage at a temperature below about 180° F. to dissolve at least about 90 percent of the phosphate values in the rock and produce a monocalcium phosphate-phosphoric acid-water solution up to about 90 percent saturated with monocalcium phosphate and containing insoluble material and less than about 1 percent fluorine, the weight ratio of $P_2O_5$ in the acid to $P_2O_5$ in the rock feed being sufficient to dissolve the phosphate values in the rock and provide the desired solution and at least about 7:1, separating the insoluble material from the solution to produce a solution of monocalcium phosphate-phosphoric acid-water, reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid solution, recycling the phosphoric acid solution to the attack stage to provide said equilibrated acid, and removing a portion of the phosphoric acid as product.

INVENTOR
EVERETT N. CASE

BY McLean, Morton & Boustead

ATTORNEYS

PATENTED NOV 9 1971 3,619,136

INVENTOR
EVERETT N. CASE

PROCESS FOR PRODUCING PHOSPHORIC ACID

This invention relates to an improved process for the treatment of naturally occurring phosphate rock or by-product phosphate material to recover the phosphate values therein, and more particularly to an improved wet process for the digestion of phosphate material and the production of phosphoric acid of good purity as well as calcium sulfate of relatively high purity.

In the manufacture of phosphoric acid from phosphate rock, fluorine which is present in most, if not all, commercial rocks, gives rise to considerable problems. It is desired to obtain a phosphoric acid product of low fluorine concentration and, in addition, in many reaction systems the fluorine can appear in deleterious forms which cause considerable difficulty and increase materially the cost of manufacturing phosphoric acid.

With regard to the problems derived from the presence of fluorine in phosphate rock, there are three reactions which can occur in various systems for producing phosphoric acid and these reactions are (1) $CaF_2 + $ Strong acid e.g. $H_2SO_4 \rightarrow CaSO_4 + HF$
(2) $HF + SiO_2 \rightarrow SiF_4$
(3) $SiF_4 + H_2O \rightarrow H_2SiF_6 + SiO_2$ Strong mineral acids, for instance sulfuric acid, are employed as a reactant in most of the processes for making phosphoric acid and these strong acids participate in reaction (1) above. Thus, it is seen that if at the time of using the strong acid, calcium fluoride be present then hydrogen fluoride is an intermediate product. Most prior workers have considered this formation of hydrogen fluoride as giving a desirable route for defluorinating the system. Thus, the hydrogen fluoride reacts with silica to form silicon tetrafluoride which can leave the system as a gas. Silica is naturally present in the operation since it is a common constituent of phosphate rock and in some situations where such silica content has been insufficient, additional amounts have been purposely added to react with hydrogen fluoride and thereby form increased amounts of silicon tetrafluoride to denude the system of as much fluorine as possible. This manner of reducing the fluorine content of the system results in considerable expense since silicon tetrafluoride is highly corrosive and special gas handling and disposal facilities must be provided. Moreover, reaction (3) above shows that at least some of the silicon tetrafluoride reacts with water to form fluosilicic acid which eventually appears as such in the phosphoric acid product or is transformed into insoluble and undesirable fluosilicates which can increase the retention of gypsum scale in the process equipment. Undue amounts of fluorine in the phosphoric acid make it less acceptable for use, for instance, in the manufacture of animal feeds and high analysis fertilizers.

An important aspect of the process of the present invention lies in its avoiding to a considerable extent, the foregoing three reactions. This goal is attained through control of the reactants, their order of use, the sequence of processing steps and the operating conditions in my method.

Calcium and fluorine, probably as calcium fluoride, are present in phosphate rock, and as noted above if the rock is digested with a strong acid hydrogen fluoride is formed. In the method of the present invention this reaction is minimized by initially contacting and extracting fluorine-containing phosphate rock with a dilute solution of phosphoric acid and in the presence of a large concentration of calcium ions so that a lesser amount, if any, of hydrogen fluoride is formed. As a result the calcium fluoride component remains to a considerable extent as an insoluble constituent which can be physically separated from the liquid phase product of the extraction. Thus when a strong acid, for instance, sulfuric acid, is later employed in the method of the present invention to treat the liquid phase extraction product, the amount of calcium fluoride encountered is less or so low that a smaller amount, if any, of hydrogen fluoride is formed. Without hydrogen fluoride reaction (2), that is, the reaction between hydrogen fluoride and silica, can not proceed and the formation of silicon tetrafluoride is minimal. Moreover, silica which is also insoluble in the initial extraction liquid of the operation of the present invention, is separated so that any calcium fluoride which is soluble and present in the liquid product will not be transformed into silicon tetrafluoride through subsequent contact with sulfuric acid since little, if any, silica is present to react with the hydrogen fluoride.

By avoiding the formation of silicon tetrafluoride to any real extent, the difficulties and expense of handling this component and protecting equipment against its corrosive action, as well as disposing of the silicon tetrafluoride gas, are minimized. Thus, in the method of the present invention a large amount of the fluorine component of the rock is neither expelled from the system as a gas, nor solubilized in significant amounts in the phosphoric acid product. Since the liquid extraction phase passing to the sulfuric acid treatment of the method of the present invention contains lesser amounts, if any, calcium fluoride or silica there is also observed a considerable savings in sulfuric acid consumption because less hydrogen fluoride is produced and subsequently lost as silicon tetrafluoride, Therefore, a salient feature of the method of the present invention is the avoidance of high acid strengths, low acid to rock ratios, and severe reaction conditions, for instance, high temperatures, in the initial extraction of the phosphate rock. As these conditions become more severe the likelihood of producing hydrogen fluoride in the presence of silica is increased as are the chances of obtaining undesirable production of silicon tetrafluoride and fluosilicic acid and its salts. The method of the present invention largely avoids the foregoing problems while at the same time providing high yields of phosphoric acid from the phosphate rock, for instance, at least about 90 or even at least about 95 weight percent recovery of the phosphorous present as tricalcium phosphate in the rock. Although the process of the instant invention involves the sequential use of phosphoric and sulfuric acids in the treatment of phosphate rock, the conditions and other steps of the operation are essential to attainment of the desired results.

Prior workers in the art have used these acids sequentially in treating phosphate rock, e.g., see U.S. Pats. No. 2,338,408, 2,899,292 and 3,150,957, but the operations described in the existing art have not reached the results of the method of the present invention. U.S. Pat. No. 3,150,957 describes a procedure which recovers a maximum of about 70 percent of the phosphorus values in the rock even though the reaction conditions are relatively severe. The process of the patent does not obtain the high yields of low fluorine-containing phosphoric acid as produced by the operation of the present invention which depends on removing the silica and the major amount of fluorine components of the rock in the solid phase separated from the initial liquid extraction product. Thus, in my process less severe reaction conditions are employed and yet the extent of phosphorus recovery is high. U.S. Pat. 3,150,957 does not teach the importance of avoiding the formation of silicon tetrafluoride, and the patent describes the use of low acid to rock ratios, usually at relatively severe reaction conditions, which give one or both of silicon tetrafluoride formation and low recovery of the phosphorus values of the rock.

U.S. Pat. Nos. 2,338,408 and 2,899,292 are also examples of prior art disclosures showing the use of severe reaction conditions which ultimately produce hydrogen fluoride in the presence of silica thereby resulting in the formation of silicon tetrafluoride and fluosilicic acid, and suffering their attendant disadvantages. The method of the present invention avoids these undesirable results by using relatively mild initial extraction conditions in the treatment of phosphate rock and yet obtaining high recovery of phosphorus values and without the necessity of invoking undue process time.

Further in accordance with this invention, an improved wet process has been discovered whereby phosphoric acid of good purity containing less than about 1 weight percent fluorine and only small amounts of other impurities such as gypsum and iron, aluminum and silicon compounds, can be produced from phosphate rocks, even those containing substantial amounts of fluorine, Also, in the improved process of this invention, excessive foaming in the digestion system is avoided. In general, in accordance with the process of the present invention the tricalcium phosphate values of the phosphate rock are dissolved, predominantly as monocalcium phosphate, and relatively small amounts or no fluorides or other undesirable components of the rock are extracted. Thus, much of the undesirable components of the phosphate rock remains as easily separable solids or colloidal material following the rock digestion stage and can be separated to provide a solution of monocalcium phosphate and phosphoric acid which can be reacted with sulfuric acid to provide relatively pure gypsum and phosphoric acid product.

The digestion of phosphate rock and production of phosphoric acid operations based upon the present invention can take the form of several different systems, such as those described in more detail hereinbelow and with reference to the attached drawings in which.

Figure 1:
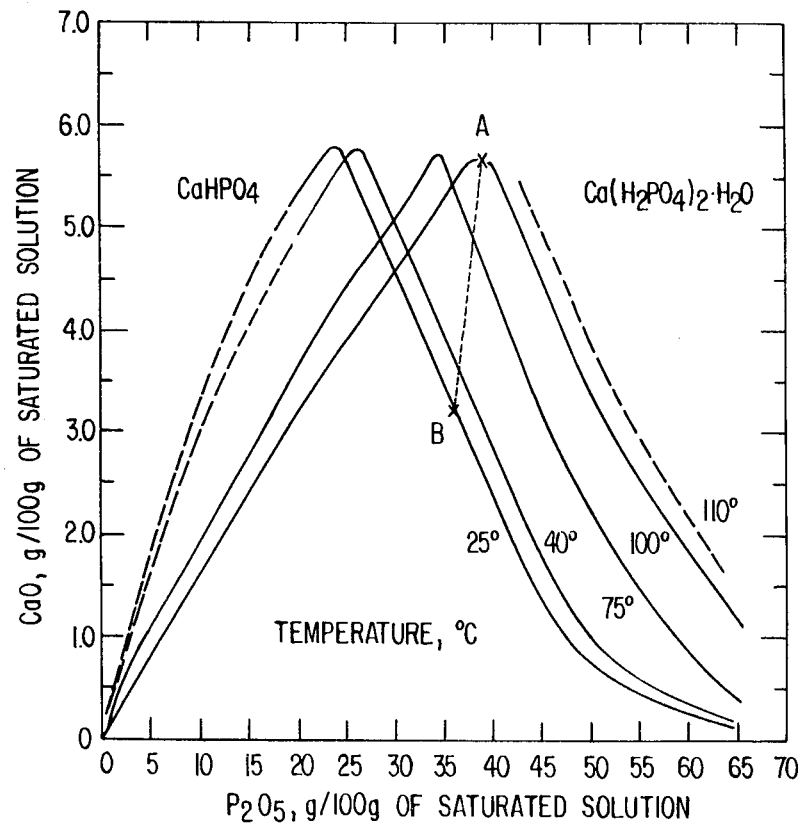
FIG. 1 is a graph representative of the solubility of calcium phosphates in phosphoric acid solutions.

The phosphate rock treated in the digestion or attack stage of this invention can be any suitable mineral material containing phosphatic values ordinarily used in the production of phosphoric acid and the like. There are essentially no limitations as to size of the rock or BPL (bone phosphate of lime, or tricalcium phosphate) percentages, and, for example, rock containing as low as about 10, or 20 percent BPL, and as high as 75 percent BPL, or more, can be used.

The present invention is particularly suited for digestion of phosphate rocks having a fluorine content above about 1.5 or 2 percent, and is particularly useful for digestion of rocks containing even higher amounts of fluorine or unusually high fluorine to silica ratios, e.g. usually up to about 5 percent fluorine, although in general the process is independent of the fluorine content of the rock. The amount of fluorine is generally a function of the geology of the region from which the rock is obtained. In the present invention the geographical region of the rock does not appear to be significant. The pebble rock of Florida can be utilized in the process as well as the phosphate ores from Tennessee, Baja California, Mexico, Morocco, and other locations. Typical commercial ground phosphate rock is available in sizes on the order of −200 mesh and can be used in this process. Commercial rock, however, is usually ground rock since mine run rock (as it comes from the jaw crushers utilized in most mining operations) is normally about 1 to 4 mesh. Mine run rock can, if available, be employed in this process and, in fact, would be preferable since its use would not include the expense of grinding. Also, employing the larger rock size makes the separation of the silica and other solids remaining after the digestion stage easier. Although, as discussed, rock of substantially any size can be used, rock of about −20 mesh is particularly suitable for use in the system of the present invention.

Table I gives representative analysis of commercial phosphate rocks.

In ordinary wet processes for the production of phosphoric acid, the iron and aluminum contained in phosphate rock usually ends up in the form of phosphates which, due to their solubility characteristics, are typically found to some extent in the gypsum cake produced and are lost to the system as phosphate values. Also, their presence in the gypsum contributes to its unsuitability for commercial purposes such as wallboard manufacture. The inability to recover such values is primarily due to the small amounts present in the gypsum cake, e.g. on the order of about 2 lb. in 110 or more pounds of gypsum cake. An advantage of the present invention is the ability to recover such iron and aluminum phosphates if such

TABLE I is desired. The iron and aluminum phosphates can easily be recovered since they are removed along with the calcium fluoride as solids from the effluent of the digestion stage. Such iron and aluminum phosphates can amount to, for example, as much as 2 lbs. in 15 lbs. of solids and can be used in the production of low analysis fertilizers. Essentially none, or relatively little, of the iron or aluminum will be in the gypsum cake of this invention.

The temperature of the attack or rock extraction system should, in general, be below that at which substantial amounts of foam are generated and sufficiently mild to avoid undue formation of hydrogen fluoride. In general, temperatures from ambient up to about 180° F., preferably up to about 135° or 140° F., are used. Although, generally, the lower the temperature the better the reaction insofar as the reduced foam in the attack stage is concerned, the reaction is exothermic so that cooling of the attack stage could be required for maintenance of low temperatures. Accordingly, the attack stage can be operated at the lowest economically feasible temperature. Typically, temperatures within the attack system will be on the order of 125° to 135°, or 140° F. The temperature within the attack system can, if desired, be controlled by cooling the digesting acid and letting the temperature rise in the attack stage without control. Also, since the fumes evolved from the attack stage are essentially only carbon dioxide, it is also possible to cool the attack stage by blowing air through or across the liquid within the attack stage to remove water vapor. Blowing the air through the liquid also provides agitation. In the conventional processes, such blowing is seldom done since the evolved gases include hydrogen fluoride and silicon tetrafluoride which must be scrubbed out before the gases are released to the atmosphere. The holding time within the attack system can be sufficient to dissolve substantially all of the tricalcium phosphate values in the rock and can vary, depending upon the analysis of the phosphate rock, the size of the phosphate rock, the analysis of the digesting acid, temperature, etc. Suitable reaction times vary from a matter of a few minutes up to several, e.g. three or four, hours or more. For most applications, a reaction time of about one hour is sufficient.

The construction of the digestion or attack stage of the present invention can be in accordance with one of the several conventional systems used in the wet process. Generally, such systems involve contacting the phosphate rock with acid in several stages. For example, the rock and acid can be mixed and passed cocurrent through a series of mixing stages which function primarily as batch reactors. Additional acid may be added in any of the separate stages. Another conventional type of system is to mix acid and rock, separate the liquid material and remix the rock with additional acid in a second stage. In still another system the rock remains stationary and the acid flows through and around the rock.

The digesting acid used in the attack stage is an equilibrated, or recycle phosphoric acid, having a $P_2O_5$ concentration of between about 20 and 50 percent, preferably between about 25 and 40 percent. Since the only component of the phosphate rock which it is desired to dissolve is tricalcium phosphate, the composition of the acid used is a very important consideration in the present invention, and the $P_2O_5$ concentration of the digesting acid as well as the ratio of digesting acid to phosphate rock is each controlled so that the acid leaving the attack stage contains substantially all of the phosphorus initially in the rock as tricalcium phosphate, at a concentration that is below the solubility limit for monocalcium phosphate, i.e. essentially all of the tricalcium phosphate will be in solution as monocalcium phosphate. Often the amount of monocalcium phosphate in the slurry will be above about 50 percent, a e.g., at least about 75 percent, and often as high as about 90 percent, of the equilibrium solubility of monocalcium phosphate in the equilibrium acid. The equilibrium solubility is the point at which the digesting acid is saturated with monocalcium phosphate and the acid will pick up no more phosphate from the rock. This particular point is a function of temperature and acid concentration.

FIG. 1 illustrates the pure component solubility curves for calcium phosphate in phosphoric acid solutions at several different temperatures. By operating the system below the equilibrium solubility there will be no precipitation of phosphate values in handling of the slurry and liquid streams. Although it is desired to maintain the system at above about 50 percent of the equilibrium value, it would, of course, be possible to operate at even lower values although the economics of the system would then be decreased. As FIG. 1 illustrates, the solubility curves for calcium phosphate in phosphoric acid have a peak so that if the $P_2O_5$ acid concentration is past the peak for a given temperature curve, the higher the $P_2O_5$ acid concentration the more the ability of the acid to dissolve additional phosphate is decreased so that greater volumes of acid would be required to dissolve the same amount of phosphate from the rock. The same is true with lower concentrations of $P_2O_5$ the acid below the peak in the curve. The most desirable $P_2O_5$ concentration in the acid is close to the peak and within the range described above, that is, for the temperatures to be used with the invention between about 20 and 50 percent, preferably between about 25 and 40 percent. A more preferred range would be in the range of about 30 to 40 percent $P_2O_5$ in the acid.

The digesting acid in the present invention is as mentioned above, an equilibrium or equilibrated acid, that is, a recycle acid saturated with respect to the undesirable rock components being separated, including fluorine, calcium sulfate, and $R_2O_3$ ($Al_2O_3$ and $Fe_2O_3$) components at the temperatures of the process. Such equilibrium amounts are the solubility limits for the various components at the conditions of the process and will include less than about 1 weight percent fluorine, often at least about 0.3 weight percent fluorine, and about 0.5 to 2 weight percent $R_2O_3$, at temperatures of about 70° to 180° F. Once the system is established, there will be no significant increase in these equilibrium amounts in the product phosphoric acid so that removal of the fluorine, silicon and $R_2O_3$ components in excess of the equilibrium amounts will then be essentially complete. Initially, in starting up a process in accordance with this invention, an equilibrium acid under the process conditions is first established. This equilibrium acid then does not change materially and is essentially the same as the product acid.

In general, weight ratios of the $P_2O_5$ in the digesting acid to the $P_2O_5$ in the phosphate rock on the order of at least about 7 to say about 25:1, or higher, e.g. up to about 80 or 100:1 and above, are suitable. The lower value for recycle ratio is, in fact, determined by the amount of phosphate in the rock and the amount which can be dissolved by the digesting acid to provide an acid containing the above discussed concentration of monocalcium phosphate. Accordingly, once the $P_2O_5$ concentration in the digesting acid is selected, the acid to rock ratio is committed where it is desired to produce a slurry containing a particular amount of monocalcium phosphate in solution.

The product of the attack stage is a slurry comprising a monocalcium phosphate and phosphoric acid-water solution containing dissolved materials and solids which include the soluble and insoluble portion of the $R_2O_3$ components, calcium sulfate and calcium fluoride, as well as silica which is insoluble. The solids can be separated from the slurry, e.g. by conventional procedures such as settling, decanting, filtering, centrifugation, etc. It is most desired to obtain a monocalcium phosphate solution essentially free of solid and colloidal materials and, preferably, the suspended materials in the separated solution do not exceed about 4 grams per liter of solution. The suspended materials can be present in the range of less than about 2 to 3 grams, and often less than about 1 to 2 grams, per liter of separated solution.

The particular separation procedure chosen is usually a matter of economics. For many applications, a filter or a settling system particularly a two-stage settling system, will be satisfactory. In a two-stage settling system, the primary settling stage can first remove silica and any other large solids with a settling time on the order of about 15 minutes to 1 hour. Subsequently, the secondary settling step can remove the "slime" remaining, which can be composed generally of particles in the size range of up to about 50 microns, often about 3 to 50 microns, and contains some calcium sulfate, the $R_2O_3$, and calcium fluoride. Settling times of about 6 to 15 hours are suitable for slime removal. When using a settling system, a further criteria on the $P_2O_5$ concentration of the digesting acid and on the concentration of monocalcium phosphate in the solution obtained from the attack system, can be considered since, as the monocalcium phosphate concentration in the product solution increases, the density of the product solution approaches the density of the solids which are to be settled. Also, the viscosity increases and, as the density and viscosity increase, the rate of settling may decrease to a point where the solids will not settle. At this point the use of filtration alone may suffice.

The residue from the separation system, e.g. from both the primary and secondary settling steps will, preferably, be washed with water and/or recycle acid to reduce the phosphates in the residue and the wash waters added to the solution obtained from the secondary settling step. It can also be desirable to provide temperature control in the separation system since the amount of phosphorus values lost as iron and aluminum phosphates in the slime is a function of temperature, and it is desired to minimize this loss. When temperature control is desired, the temperature of the separation stage will generally be held at, or slightly above, the temperature of the attack stage, e.g. up to about 210° F., but below the boiling point of the solution. It is possible to heat the solution at this point without a foaming problem since this solution is a highly concentrated monocalcium phosphate solution. Hydrogen fluoride will tend not to be produced upon heating since the presence of large amounts of monocalcium phosphate suppresses the reaction of calcium fluoride and phosphoric acid to produce hydrogen fluoride. Also, since the silica from the rock is removed in the first part of the separation stage and is not present in significant amounts to react with hydrogen fluoride, silicon tetrafluoride will not be produced in material quantities. The solubility of hydrogen fluoride in the system is much greater than that of silicon tetrafluoride so that, even if some hydrogen fluoride be produced, it will tend to remain in solution.

In the present invention the problems of prior processes are overcome by controlling the digestion step in the following ways: an equilibrated acid, that is, an acid which is essentially saturated with respect to all the components in the system except monocalcium phosphate is used to digest rock. The ratio of $P_2O_5$ in the acid to $P_2O_5$ content in the phosphate is high, i.e. at least about 7:1, and preferably at least about 9 and up to about 100:1, which for a typical rock and typical acid concentration is a weight ratio of acid to rock of at least about 5:1, preferably about 10:1 and up to about 30:1. The net result of using mild reactions conditions, relatively low acid concentrations, high ratios of acid to rock, and an equilibrium acid is to produce a solution of monocalcium phosphate from rock in which substantially only the calcium phosphate values of the rock are taken into solution. There are apparently relatively small amounts, if any, new fluorine compounds produced not native to the rock, e.g. not $SiF_4$ or fluosilicates, and essentially no phosphate values need be left undissolved as rock. In short, the improved process can give substantially quantitative conversion of tricalcium phosphate into monocalcium phosphate which is selectively dissolved in an equilibrium acid.

An equilibrium acid in the terms of this process, as defined above, is a phosphoric acid of the appropriate concentration which is essentially saturated with respect to each element and compound introduced by the rock or during calcium sulfate precipitation but one which is substantially less than saturated with respect to monocalcium phosphate. For example, the acid is saturated with respect to the major components calcium sulfate, calcium fluoride, and iron and aluminum compounds. It may or may not be saturated with respect to the minor components such as magnesium, sodium, potassium, etc. The manner in which an equilibrium acid can be obtained is contact of any phosphoric acid, e.g., furnace grade or commercial grade, with rock as the first step. The dissolved calcium is then removed as calcium sulfate by the addition of sulfuric acid to reduce the saturation with respect to monocalcium phosphate. The resultant phosphoric acid is returned to its original concentration by adjusting the water content. This acid is then used to recontact rock, etc. The procedure is repeated as many as five or more times, until there is no further change in the concentration of the components to be equilibrated.

The use of an equilibrium acid in the ratios designated for the present invention avoids strongly attacking the phosphate rock. Accordingly, the undesirable components of the rock cannot go into the equilibrated acid solution in the attack stage but, since the acid is not saturated with monocalcium phosphate, the phosphate can go essentially completely into solution. Therefore, after the phosphoric acid reacts with the phosphate rock to form monocalcium phosphate, the calcium fluoride for the most part is not dissolved but remains as a solid in the slurry produced in the attack system and can be easily removed. Control of the temperature, for example, also inhibits reaction of phosphoric acid with the calcium fluoride to produce hydrogen fluoride. Accordingly, virtually all impurities in the rock, except the carbonates, will remain in solid form following the attack system, including silica, iron, aluminum, etc., thereby leaving on separation a relatively clear solution of monocalcium phosphate in phosphoric acid and water. The solids are removed either as sand or slime, which will contain the insolubles including some metal phosphates. The removal of the impurities in solid form avoids the problems inherent in the formation of hydrogen fluoride and silicon tetrafluoride, foaming, etc., and relatively pure phosphoric acid and gypsum can be produced from this solution.

Figure 2:
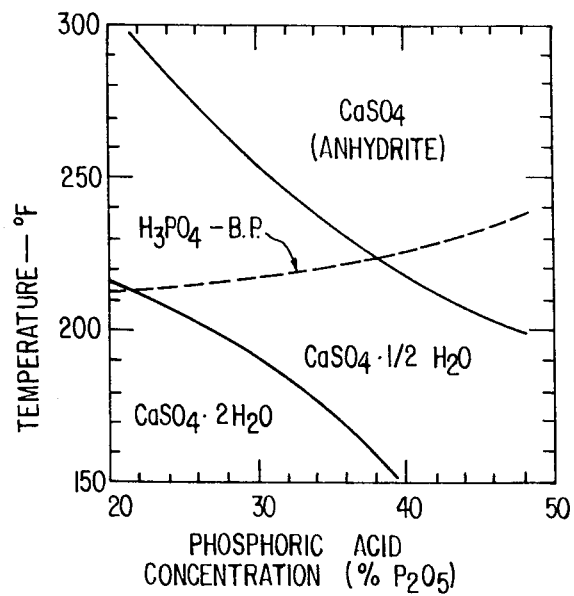
FIG. 2 is a graph illustrative of the relationship of temperature and phosphoric acid concentration to the production of the dihydrate, hemihydrate and anhydrite forms of calcium sulfate.

The monocalcium phosphate solution is passed into a precipitation stage where sulfuric acid is added to precipitate calcium sulfate as the dihydrate, hemihydrate, or anhydrite, depending upon the conditions chose, particularly temperature and phosphoric acid concentration. FIG. 2 is a graph illustrating a phase system for the production of dihydrate, hemihydrate and anhydrite. As will be noted, in general, as the conditions become more severe, the tendency is to go from production of the dihydrate to production of the hemihydrate and then to the anhydrite. The concentration of the acid in the monocalcium phosphate and phosphoric acid solution removed from the separation stage is essentially the same as the digesting acid feed to the attack stage since the recycle ratio of acid to fresh rock is relatively large and in general, the acid concentration is in the range of about 20 to 50 percent $P_2O_5$, preferably about 25 to 40 percent $P_2O_5$. Accordingly, the temperature of the digesting acid will generally determine the form of calcium sulfate produced unless there is intermediate cooling, although the concentration of the solution can be varied by isolating the various wash streams or adding additional water, as desired. In general, for the acid concentrations used, the dihydrate is produced at temperatures in the range of about 150° to 215° F., the hemihydrate at temperatures in the range of about 175° to 275° F., and the anhydrite at temperatures between about 225° F. and the boiling point of the solution.

Sulfuric acid is added to the precipitation stage in an amount essentially stoichiometric, e.g. at least about 90 percent stoichiometric, and preferably higher, with regard to the calcium, as phosphate or carbonate present but not calcium present as calcium fluoride, to precipitate essentially all of the calcium as calcium sulfate in the desired hydrated state and produce phosphoric acid. To the extent that the amount of sulfuric acid exceeds stoichiometric, sulfuric acid is introduced into the digestion system and many of the problems solved by the instant process will appear, possibly even including precipitation in the attack stage of calcium as calcium sulfate. Below stoichiometric, the chemistry of the process is in accordance with this invention but the economics of the process become less desirable since the size of the plant required goes up.

Although stoichiometric amounts of sulfuric acid are used in the precipitation stage of the present invention, it is known that for the production of easily filterable crystals of calcium sulfate, e.g. gypsum, it is desirable to have an excess of sulfuric acid present during precipitation. Accordingly, a slip stream or minor portion of the clear monocalcium phosphate solution can be diverted prior to the precipitation stage and all the sulfuric acid to be used is added to the remaining major portion of the monocalcium phosphate system, temporarily providing an excess of sulfuric acid for the monocalcium phosphate solution and thereby producing good crystals. The slip stream is then combined with the slurry of crystals and phosphoric acid produced in the precipitation stage to neutralize the excess sulfuric acid and produce additional crystals and phosphoric acid. Therefore, across the entire precipitation stage an essentially stoichiometric amount of sulfuric acid can be used, although internally an excess of sulfuric acid can appear in a portion thereof. The amount of the slip stream will depend upon the concentration of the monocalcium phosphate solution but can be on the order of about 10 to 50, preferably about 15 to 30, weight percent of the solution. Precipitation times in the presence of the excess sulfuric acid can be on the order of about 1 to 7 hours, or more, preferably about 3 to 5 or 7 hours. Sulfuric acid of any commercial grade, e.g. about 93 to 97 percent, is suitable and the preferred concentration depends upon water and heat balances for the system. The slurry removed from the precipitation stage can be filtered according to conventional procedures, for example, with a Prayon or other conventional filter to remove the calcium sulfate crystals from the phosphoric acid. The phosphoric acid will be recycled to the attack stage to provide the equilibrated phosphoric digesting acid. A portion of the acid will be removed as product.

The advantages of the system in accordance with the present invention are substantial. The raw material costs are reduced since substantial amounts of sulfuric acid are not consumed to convert calcium fluoride to hydrogen fluoride which would be lost through conversion to silicon tetrafluoride. The excess sulfuric acid desired to make good calcium sulfate crystals can be utilized to scavenge a portion of the monocalcium phosphate solution and precipitate additional calcium sulfate. By considerably avoiding formation of hydrogen fluoride and silicon tetrafluoride, the system has decreased pollution and recovery systems, decreased corrosion problems, increased acid purity, increased gypsum purity, decreased foam problems, etc. Furthermore, in the present invention, it is unnecessary to grind the phosphate rock, particularly as fine as heretofore. Furthermore, the silica, or sand stream recovered in the separation stage is a relatively high quality source of quartz. Also, the calcium fluoride in the slime is a potential source of fluorine and the phosphate values in the slime can be recovered, if desired.

Figure 3:
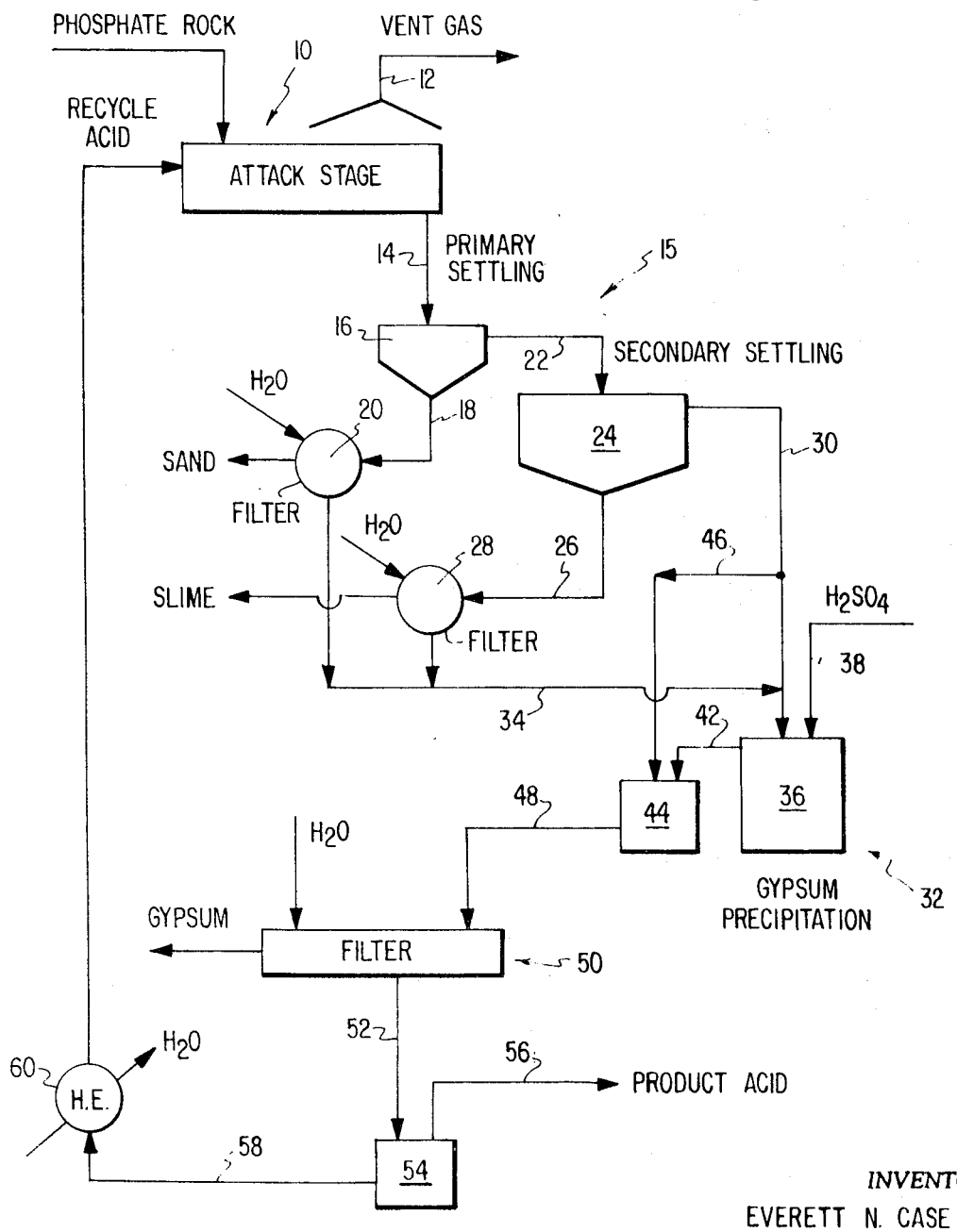
FIG. 3 is a flow sheet illustrating one system for the production of phosphoric acid utilizing the present invention.

Referring now to FIG. 3, which illustrates a specific system incorporating the present invention, as described above, phosphate rock is introduced into attack stage 10 and reacted with a digesting acid to produce a slurry comprising a monocalcium phosphate-phosphoric acid-water solution containing insoluble materials. The carbon dioxide evolved in this reaction is removed through line 12. The slurry is removed from attack stage 10 through line 14 and passed to the separation stage, generally designated as 15. As illustrated in FIG. 3, the separation stage is a two-stage settling system. The slurry is passed into primary settling tank 16 in which the heavier particles, predominantly silica, or sand, are settled and removed via line 18. The sand is collected and washed in filter 20 to recover soluble materials, predominantly phosphates, which may be removed with the sand from tank 16. The slurry passes from settling tank 16 through line 22 to secondary settling tank 24 where the smaller particles of insoluble materials are removed. The smaller particles, known as slime, often are in the size range of about 3 to 50 microns and settle slower than the sand. The slime is removed from tank 24 through line 26, separated in filter 28 and washed. It can be desirable, particularly with short residence times in the attack stage 10, to first wash the slime, or a mixture of slime and sand with the process equilibrium acid to scavenge any phosphate values remaining therein.

The liquid removed from tank 24 is an essentially clear monocalcium phosphate-phosphoric acid-water solution and is conveyed through line 30 to a gypsum precipitation stage, generally designated as 32. The combined wash waters from filters 20 and 28 can be passed through line 34 and combed with the solution in line 30, or line 46, if desired. The combined wash waters can, for the reasons described above, be used to control the concentration of the phosphoric acid in the gypsum precipitation stage. The precipitation stage generally comprises a precipitator 36 and a sulfuric acid scavenger 44. Sulfuric acid is added to precipitator 36 through line 38 in an amount to provide an excess of sulfuric acid above the stoichiometric amount with respect to the monocalcium phosphate within this vessel. The sulfuric acid reacts with the monocalcium phosphate in precipitator 36 to produce calcium sulfate crystals and phosphoric acid, and a slurry of these materials is removed from precipitator 36 through line 42 and conveyed to scavenger 44 where a slip stream of the monocalcium phosphate-phosphoric acid-water solution from line 30 is introduced through line 46 to utilize the excess sulfuric acid present in precipitator 36 for precipitation of additional calcium sulfate. The calcium sulfate-phosphoric acid-water slurry is removed from scavenger 44 through line 48 and passed to a filter system 50, of conventional construction. The sulfuric acid is added to precipitator 36 in an amount stoichiometric with respect to the monocalcium phosphate in the solution in line 30, that is, the total solution taken from settler 24. The wash water in line 34 can be added to line 30, as shown, or, of desired, to line 46, to control the desired concentration of the solution in line 30, the excess of sulfuric acid to be added, etc.

Calcium sulfate is separated from the phosphoric acid in filter system 50 and the phosphoric acid solution produced is removed through line 52 to holdup vessel 54. Product acid can be removed from vessel 54 through line 56. The phosphoric acid solution is also removed from vessel 54 through line 58, cooled in heat exchanger 60, if desired, and then passed to the attack stage 10 to provide the digesting acid feed for the attack stage. It can be desirable to decant the slurry in line 48 prior to filtering and thereby reduce filter loading. The decanted clear solution could be combined with the phosphoric acid solution in line 52 or 58. As discussed above, the temperature and concentration of the digesting acid and the ratio of the acid to the rock are important variables. The ratio can be controlled by varying the amount of product acid removed from vessel 54. The concentration of the recycle acid can be controlled by the addition or removal of water from the product acid, for instance, in vessel 54 or line 58, as well as filters 20 and 28, and filter 50.

The following examples are intended to further illustrate the invention.

EXAMPLE I

The composition in parts by weight of the various steams in a system as described above with reference to FIG. 3 are set forth in table II. The phosphoric digestion acid contains about 30 percent $P_2O_5$ and the rock contains about 32.1 percent $P_2O_5$ (BPL of about 70 percent). The attack stage is operated with an inlet acid temperature of between 125 and 130° F. and an outlet temperature of about 140 to 145° F. The digesting acid to rock weight ratio is about 10 to 1. The phosphate rock is retained within the attack stage for approximately three hours and the two-stage settling system of FIG. 1 is used with a primary settling time of about 15 minutes and a secondary settling time of about 9 hours. The precipitation stage is operated at temperatures sufficient for the precipitation of gypsum (calcium sulfate dihydrate); that is, somewhat higher than the attack stage but below about 190° F., about 150° F. The weight ratio of the slip stream in line 46 to the remaining monocalcium phosphate phosphoric acid solution in line 30 is about 1:4 and the sulfuric acid added to vessel 36 is the stoichiometric amount for the precipitation of gypsum and formation of phosphoric acid from the monocalcium phosphate in the solutions in lines 30 and 34, which proves an excess of $H_2SO_4$ in vessel 36 to produce good gypsum crystals. Once the system establishes an equilibrium acid, the produced acid is removed in an amount sufficient to remove approximately the same amount of $P_2O_5$ as added in the phosphate rock. The composition of acid in table II is an equilibrated acid, at essentially room temperature. At the operating temperatures, additional materials will go into solution reducing the parts by weight in the slime so that the $R_2O_3$ in line 26 will be about 2.1 and in line 56 will be about 0.6 and the ($CaF_2$) will be about 7.5 in line 26 and about 0.9 in line 56.

between about 20 to 50 percent in an attack stage at a temperature below about 180° F., said equilibrated acid being essentially saturated with respect to the fluorine component of said rock at the temperature of said attack stage, said temperature and the time of reaction serving to dissolve at least about 90 percent of the tricalcium phosphate in the rock and produce a monocalcium phosphate-phosphoric acid-water solution up to about 90 percent saturated with monocalcium phosphate, and containing insoluble material and a fluorine content less than about 1 percent, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution to produce a solution of monocalcium phosphate-phosphoric acid-water, said solution having a fluorine content of less than about 1 percent, reacting sulfuric acid with said solution to produce phosphoric acid and precipitate calcium sulfate, the sulfuric acid being added

TABLE II

| | Rock feed | Acid line 58 | Slurry line 14 | Vent line 12 | Slurry line 22 | Line 18 | Solution line 30 | Slime line 26 | $H_2SO_4$ line 38 | Slurry line 48 | Acid line 56 | $CaSO_4$ |
|---|---|---|---|---|---|---|---|---|---|---|---|---|
| $P_2O_5$ | 32.1 | 300.0 | 332.1 | | 332.1 | | 329.79 | 2.32 | | 329.79 | 29.79 | |
| CaO | 45.9 | | ¹39.87 | | ¹39.87 | | ¹39.87 | | | | | |
| BPL | 70.0 | | | | | | | | | | | |
| $Al_2O_3$ | 1.35 ⎫ | 6.20 | 8.94 | | 8.94 | | 6.816 | 2.124 | | 6.816 | 0.616 | |
| $Fe_2O_3$ | 1.39 ⎭ | | | | | | | | | | | |
| $SiO_2$ | 5.41 | | 5.41 | | | 5.41 | | | | | | |
| F | 4.12 | | | | | | | | | | | |
| $CaF_2$ | | | 9.51 | 17.95 | | 17.95 | | 10.454 | 7.496 | | 10.454 | 0.955 | |
| $CO_2$ | 3.76 | | | 3.76 | | | | | | | | |
| $CaSO_4$ | 2.17 | 6.00 | 8.17 | | 8.17 | | 6.00 | 2.17 | | 102.80 | 0.596 | 96.204 |
| Others | 2.73 | 27.49 | 30.22 | | 30.22 | | 30.22 | | | 30.22 | 2.73 | |
| $H_2O$ | | 650.76 | 650.76 | | 650.76 | | 650.76 | | 51.85 | 715.38 | 64.62 | |
| $H_2SO_4$ | | | | | | | | | 69.70 | | | |

¹ Dissolved as $Ca(H_2PO_4)_2$.

EXAMPLE II

The process described in example I can be operated to produce relatively pure gypsum and phosphoric acid utilizing an equilibrated acid having the following $P_2O_5$ concentrations and at weight ratios of acid to rock and temperatures in the attack stage as set forth in table III.

TABLE III

| | $P_2O_5$ Conc. | Acid: Rock Ratio | Temperature |
|---|---|---|---|
| Example II | 40 wt. % | 10:1 | 130°–140° F. |
| Example III | 25 wt. % | 20:1 | 150°–160° F. |
| Example IV | 20 wt. % | 40:1 | 130°–140° F. |
| Example V | 30 wt. % | 20:1 | 130°–140° F. |
| Example VI | 30 wt. % | 30:1 | 110°–120° F. |
| Example VII | 30 wt. % | 10:1 | 150°–160° F. |
| Example VIII | 25 wt. % | 30:1 | 130°–140° F. |

EXAMPLE IX

The process of example I can be operated at a precipitation stage temperature between about 200 and 210° F. to precipitate calcium sulfate hemihydrite and produce phosphoric acid which are separated as described in example I.

EXAMPLE X

The process of example I can be operated with a digesting acid having 43 weight percent $P_2O_5$ concentration, an acid to rock weight ratio of 7:1, and a precipitation stage temperature of about 220° F. to precipitate calcium sulfate anhydrite and phosphoric acid. The remaining conditions are the same except that the attack stage product is vacuum filtered to produce the clear monocalcium phosphate-phosphoric acid-water solution.

It is claimed:

1. A process for the production of phosphoric acid from fluorine-containing phosphate rock having above about 1.5 percent fluorine comprising reacting the phosphate rock with an equilibrated phosphoric acid having a $P_2O_5$ concentration between about 20 to 50 percent in an attack stage at a temperature below about 180° F., said equilibrated acid being essentially saturated with respect to the fluorine component of said rock at the temperature of said attack stage, said temperature and the time of reaction serving to dissolve at least about 90 percent of the tricalcium phosphate in the rock and produce a monocalcium phosphate-phosphoric acid-water solution up to about 90 percent saturated with monocalcium phosphate, and containing insoluble material and a fluorine content less than about 1 percent, the weight ratio of $P_2O_5$ in the acid to $P_2O_5$ in the rock feed being sufficient to dissolve tricalcium phosphate values in the rock and provide the desired solution and at least about 7:1, separating the insoluble material from the solution to produce a solution of monocalcium phosphate-phosphoric acid-water, said solution having a fluorine content of less than about 1 percent, reacting sulfuric acid with said solution to produce phosphoric acid and precipitate calcium sulfate, the sulfuric acid being added in an amount essentially stoichiometric with respect to the monocalcium phosphate in the solution, separating the calcium sulfate from the phosphoric acid solution, recycling the phosphoric acid solution to the attach stage to provide said equilibrated acid, and removing a portion of the phosphoric acid as product.

2. The process of claim 1 wherein sulfuric acid is added to a precipitation zone including a precipitation step and a scavenging step, and further including separating the solution into a major and a minor portion, reacting the sulfuric acid with the major portion in the precipitation step to produce a calcium sulfate-phosphoric acid slurry, the amount of sulfuric acid being sufficient to provide excess sulfuric acid over the stoichiometric amount with respect to the monocalcium phosphate based on the total slurry, passing the slurry from the precipitation step to the scavenging step, introducing the minor portion of the solution into the scavenging step to neutralize the excess sulfuric acid present and precipitate additional calcium sulfate, the amount of sulfuric acid added to the precipitation step being essentially stoichiometric with respect to the monocalcium phosphate in the combined major and minor portions, and separating the calcium sulfate from the product of the scavenging step.

3. The process of claim 2 wherein the minor portion comprises about 10 to 50 weight percent of the solution.

4. The process of claim 1 wherein the phosphate rock has a size capable of passing through a screen having a size of about 20 mesh.

5. The process of claim 1 wherein the temperature of the attack stage is less than about 140° F.

6. The process of claim 1 wherein the weight ratio of $P_2O_5$ in the acid to $P_2O_5$ in the rock is about 9 to 30:1.

7. The process of claim 1 wherein the solution contacted with sulfuric acid contains less than about 4 grams of solid material per liter of solution.

8. The process of claim 1 wherein the reaction of sulfuric acid and the solution is carried out at a temperature of about 150° F to 215° F. and a $P_2O_5$ concentration of about 20 to 50 wt. percent, the calcium sulfate being precipitated as calcium sulfate dihydrate.

9. The process of claim 1 wherein the reaction of sulfuric acid and the solution is carried out at a temperature of about 175° to 275° F. and a $P_2O_5$ concentration of about 20 to 50 percent, and the calcium sulfate being precipitated as calcium sulfate hemihydrate.

10. The process of claim 1 wherein the reaction of sulfuric acid and the solution is carried out at a temperature of about 225° F. to the boiling point of the solution, and a $P_2O_5$ concentration of about 20 to 50 percent, and the calcium sulfate being precipitated as calcium sulfate anhydrite.

11. A process for the production of a solution of monocalcium phosphate and phosphoric acid in water, low in fluorine content and other impurities, from phosphate rock containing in excess of about 2 weight percent fluorine without evolution of silicon tetrafluoride comprising reacting the rock with an equilibrated phosphoric acid having a $P_2O_5$ concentration between about 20 and 50 weight percent in an attack stage at a temperature below about 180° F., said equilibrated acid being essentially saturated with respect to the fluorine component of said rock at the temperature of said attack stage, said temperature and the time of reaction serving to dissolve at least about 90 percent of the tricalcium phosphate values in the rock and produce a monocalcium phosphate-phosphoric acid-water solution up to about 90 percent saturated with monocalcium phosphate and containing as insoluble material calcium fluoride and silica, the weight ratio of $P_2O_5$ in the acid to $P_2O_5$ in the rock being sufficient to dissolve the phosphate values in the rock and provide the desired solution and at least about 7:1 and separating the insoluble material containing calcium fluoride and silica from the solution to produce an essentially clear solution of monocalcium phosphate-phosphoric acid-water, the solution containing less than about 4 grams solids per liter of solution and less than about 1 weight percent fluorine.

12. A process for the production of relatively pure phosphoric acid low in fluorine content and other impurities, from phosphate rock containing in excess of about 2 weight percent fluorine without evolution of silicon tetrafluoride, comprising reacting the rock with an equilibrated phosphoric acid having a $P_2O_5$ concentration between about 20 and 50 weight percent in an attack stage at a temperature below about 180° F., said equilibrated acid being essentially saturated with respect to the fluorine component of said rock at the temperature of said attack stage, said temperature and the time of reaction serving to dissolve at least about 95 percent of the tricalcium phosphate values in the rock and produce a monocalcium phosphate-phosphoric acid-water solution up to about 90 percent saturated with monocalcium phosphate and containing as insoluble material calcium fluoride and silica, the weight ratio of $P_2O_5$ in the acid to $P_2O_5$ in the rock being sufficient to dissolve the phosphate values in the rock and provide the desired solution and at least about 7:1, separating the insoluble material containing calcium fluoride and silica, from the solution to produce an essentially clear solution of monocalcium phosphate-phosphoric acid-water, the solution containing less than about 4 grams solid per liter of solution and less than about 1 weight percent fluorine, reacting sulfuric acid with the clear solution to produce a slurry comprising a solution of phosphoric acid-water and precipitated calcium sulfate, the sulfuric acid being added in an amount essentially stoichiometric with respect to the monocalcium phosphate in the solution, separating the precipitate from the phosphoric acid solution, recycling a portion of the phosphoric acid solution to the attack stage to provide said equilibrated acid and removing remaining phosphoric acid solution as product, the phosphoric acid solution containing less than about 1 weight percent fluorine.

13. The process of claim 12 wherein the $P_2O_5$ concentration in the equilibrated acid is between about 25 and 40 weight percent.

14. The process of claim 13 wherein the temperature of the attack stage is less than about 140° F.

15. The process of claim 14 wherein the $P_2O_5$ in the acid to $P_2O_5$ in the rock weight ratio is about 9 to 30:1.

16. The process of claim 14 wherein the monocalcium phosphate-phosphoric acid-water solution is at least about 75 weight percent saturated with monocalcium phosphate.

17. The process of claim 12 wherein the aluminum and iron oxide ($R_2O_3$) content of the equilibrated acid is less than about 2 weight percent.

18. The process of claim 17 wherein the fluorine and $R_2O_3$ contents of the relatively clear solution are essentially the same as that of the equilibrated acid, essentially all of the fluorine and $R_2O_3$ in the phosphate rock in excess of the amount to reach solubility equilibrium being insoluble material in the monocalcium phosphate-phosphoric acid-water solution and separated therefrom in producing the clear solution.

19. The process of claim 12 wherein the said insoluble material is separated in a separation stage having a primary settling zone, the secondary settling zone separating particles in the range of about 3–50 microns, in about 6 to 15 hours, the primary zone separating the larger particles in about 15 minutes to 1 hour.

20. The process of claim 12 wherein the reaction of sulfuric acid and the clear solution is carried out a temperature of about 150° to 215° F., and a $P_2O_5$ concentration of about 20 to 50 wt. percent, to precipitate the calcium sulfate as calcium sulfate dihydrate.

21. The process of claim 12 wherein the reaction of sulfuric acid and the clear solution is carried out a temperature of about 175° to 275° F., and a $P_2O_5$ concentration of about 20 to 50 wt. percent, to precipitate the calcium sulfate as calcium sulfate hemihydrate.

22. The process of claim 12 wherein the reaction of sulfuric acid and the clear solution is carried out at a temperature of about 225° F. to the boiling point of the solution and a $P_2O_5$ concentration of about 20 to 50 wt. percent, to precipitate the calcium sulfate as calcium sulfate anhydrite.

* * * * *

UNITED STATES PATENT OFFICE
CERTIFICATE OF CORRECTION

Patent No. 3,619,136      Dated November 9, 1971

Inventor(s) Everett N. Case

It is certified that error appears in the above-identified patent and that said Letters Patent are hereby corrected as shown below:

Column 1, Line 2 "naturally occurring" should read --naturally-occurring--;

Line 21 "e.g. $H_2SO_4$)" should read --(e.g. $H_2SO_4$)--

Column 2, Line 21 "tetrafluoride, T" should read --tetrafluoride. T--

Column 3, Line 2 "fluorine, A" should read --fluorine. A--

Column 4, TABLE I Column Titles omitted, should read --Location and Type $P_2O_5$   CaO   MgO   $Al_2O_3$   $Fe_2O_3$   $SiO_2$   $SO_2$   F   Cl   $CO_2$   Organic carbon $Na_2O$   $Ka_2O$   $K_2O$   $H_2Oa$   ZnO   SrO--

Column 4, TABLE I Notes at the bottom were omitted, should read

--a. Dried at 100°C. for several hours.
       b. Combined $Al_2O_3$ and $Fe_2O_3$.--

Column 5, Line 70 "a e.g." should read --e.g.--

UNITED STATES PATENT OFFICE
CERTIFICATE OF CORRECTION

Patent No. 3619136  Dated November 9, 1971

Inventor(s) Everett N. Case  PAGE - 2

It is certified that error appears in the above-identified patent and that said Letters Patent are hereby corrected as shown below:

Column 8, Line 43, "chose," should read --chosen,--

Column 10, Line 37 "of" should read --if--

Column 11, Line 8 "proves" should read --provides--

Column 12, Line 38 "attach" should read --attack--

Column 14, Line 2, "solid" should read --solids--

Signed and sealed this 13th day of June 1972.

(SEAL)
Attest:

EDWARD M. FLETCHER, JR.
Attesting Officer

ROBERT GOTTSCHALK
Commissioner of Patents